United States Patent
Ng et al.

(10) Patent No.: US 10,867,395 B2
(45) Date of Patent: Dec. 15, 2020

(54) SYSTEMS AND METHODS FOR REAL-TIME RIGID BODY MOTION PREDICTION

(71) Applicant: Glo Big Boss Ltd., Kowloon (HK)

(72) Inventors: Kim Wei Ng, Yuen Long (HK); Ka Lok Ng, Kowloon (HK)

(73) Assignee: Glo Big Boss Ltd., Kowloon (HK)

(*) Notice: Subject to any disclaimer, the term of this patent is extended or adjusted under 35 U.S.C. 154(b) by 63 days.

(21) Appl. No.: 16/147,107

(22) Filed: Sep. 28, 2018

(65) Prior Publication Data
US 2020/0105000 A1   Apr. 2, 2020

(51) Int. Cl.
| | | |
|---|---|---|
| G06K 9/00 | (2006.01) | |
| G06T 7/246 | (2017.01) | |
| G06T 7/292 | (2017.01) | |
| G06T 13/20 | (2011.01) | |
| G06T 7/73 | (2017.01) | |

(52) U.S. Cl.
CPC .......... *G06T 7/246* (2017.01); *G06K 9/00342* (2013.01); *G06T 7/292* (2017.01); *G06T 7/73* (2017.01); *G06T 13/20* (2013.01); *G06T 2207/10048* (2013.01); *G06T 2207/30204* (2013.01)

(58) Field of Classification Search
CPC ....... G06T 7/2046; G06T 7/246; G06T 7/292; G06T 7/73; G06T 13/20; G06K 9/00718; G06K 9/00771; G06K 9/4642; G06K 9/6212; G06K 9/6218; G06K 9/00342
See application file for complete search history.

(56) References Cited

U.S. PATENT DOCUMENTS

| | | | |
|---|---|---|---|
| 6,724,915 B1* | 4/2004 | Toklu | G06T 7/248 |
| | | | 382/103 |
| 9,122,354 B2* | 9/2015 | Sharma | G06F 3/017 |
| 10,222,450 B2* | 3/2019 | Bellusci | G06F 3/011 |
| 10,395,411 B2* | 8/2019 | Black | G06T 19/20 |
| 10,606,341 B2* | 3/2020 | Wetzler | G06F 3/017 |
| 2011/0025853 A1* | 2/2011 | Richardson | H04N 5/247 |
| | | | 348/159 |
| 2013/0094705 A1* | 4/2013 | Tyagi | G06T 7/60 |
| | | | 382/103 |
| 2014/0375635 A1* | 12/2014 | Johnson | G06T 17/20 |
| | | | 345/420 |
| 2016/0225188 A1* | 8/2016 | Ruddell | G06F 3/011 |
| 2018/0268240 A1* | 9/2018 | Loce | G06K 9/00228 |

* cited by examiner

Primary Examiner — Duy M Dang
(74) Attorney, Agent, or Firm — McDermott Will & Emery LLP

(57) ABSTRACT

Methods and systems for real-time rigid body motion prediction are provided. The method includes determining an occurrence of an untracked rigid body in a current frame, the untracked rigid body being tracked in a previous frame. The method also includes predicting a position in the current frame of the untracked rigid body using previously tracked data in the previous frame. The method also includes identifying unlabeled markers in the current frame that are proximate to the predicted position of the untracked rigid body. The method also includes reconstructing the untracked rigid body in the current frame based on the identifying of the unlabeled markers.

20 Claims, 9 Drawing Sheets

SYSTEMS AND METHODS FOR REAL-TIME RIGID BODY MOTION PREDICTION

TECHNICAL FIELD

The present disclosure generally relates to a motion prediction system, and more specifically relates to predicting a motion of a rigid body in real-time.

BACKGROUND

Recent advances in computing technology have allowed software developers to capture motion of rigid bodies in real-time. A typical optical motion capture system (or mocap system) tracks markers in a unique configuration in order to reconstruct a pose of a rigid body. However, existing techniques fail to track rigid bodies when the markers become occluded, or otherwise blocked, by objects or other environmental noise. As a result, a pose of a rigid body is unable to be recovered.

SUMMARY

The present disclosure provides for real-time rigid body motion prediction systems and methods that reconstruct a pose of a rigid body when markers are occluded.

According to one embodiment of the present disclosure, a computer-implemented method is provided. The method includes determining an occurrence of an untracked rigid body in a current frame, the untracked rigid body being tracked in a previous frame. The method also includes predicting a position in the current frame of the untracked rigid body using previously tracked data in the previous frame. The method also includes identifying unlabeled markers in the current frame that are proximate to the predicted position of the untracked rigid body. The method also includes reconstructing the untracked rigid body in the current frame based on the identifying of the unlabeled markers.

According to one embodiment of the present disclosure, a system is provided that includes means for storing instructions, and means for executing the stored instructions that, when executed by the means, cause the means to perform a method. The method includes determining an occurrence of an untracked rigid body in a current frame, the untracked rigid body being tracked in a previous frame. The method also includes predicting a position in the current frame of the untracked rigid body using previously tracked data in the previous frame. The method also includes identifying unlabeled markers in the current frame that are proximate to the predicted position of the untracked rigid body. The method also includes reconstructing the untracked rigid body in the current frame based on the identifying of the unlabeled markers.

According to one embodiment of the present disclosure, a system is provided for rigid body motion prediction including a memory storing sequences of instructions, and a processor configured to execute the sequences of instructions, which when executed, causes the processor to perform determining an occurrence of an untracked rigid body in a current frame, the untracked rigid body being tracked in a previous frame. The execution of the sequences of instructions also causes the processor to perform predicting a position in the current frame of the untracked rigid body using previously tracked data in the previous frame. The execution of the sequences of instructions also causes the processor to perform identifying unlabeled markers in the current frame that are proximate to the predicted position of the untracked rigid body. The execution of the sequences of instructions also causes the processor to perform reconstructing the untracked rigid body in the current frame based on the identifying of the unlabeled markers.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate aspects of the subject technology, and together with the description serve to explain the principles of the subject technology. In the drawings.

Figure 1:
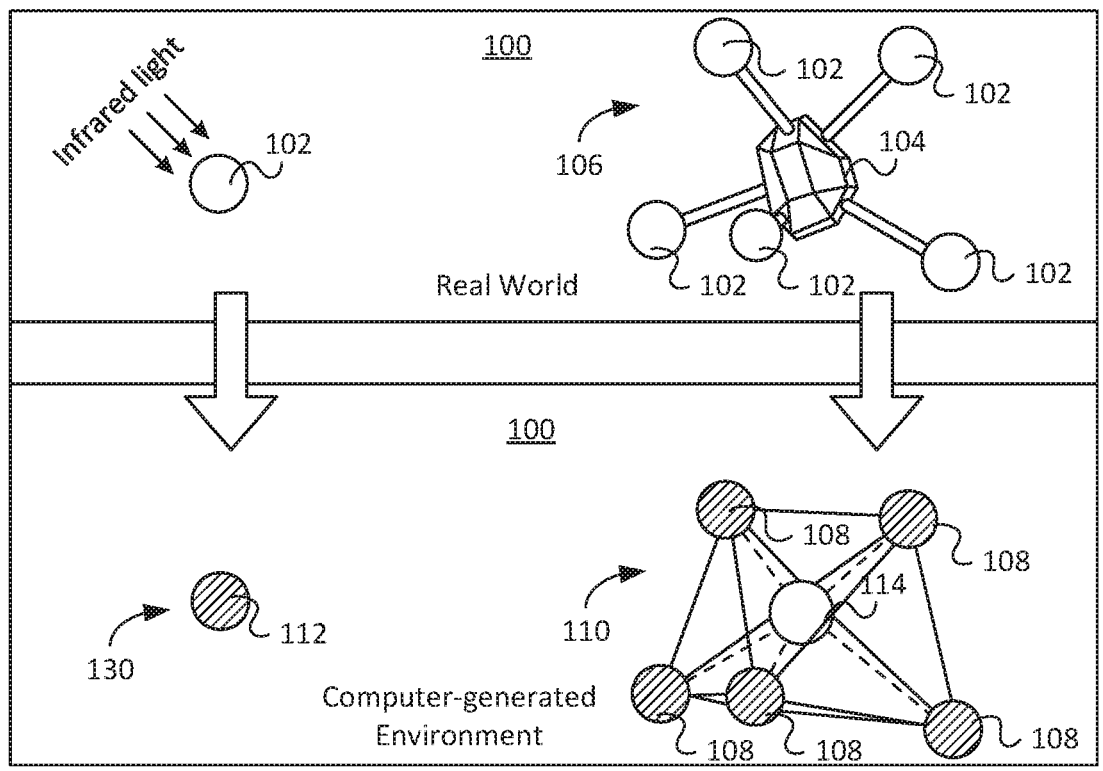
FIG. 1 illustrates an example system for motion capture in a computer-operated imaging environment suitable for practicing some implementations of the disclosure.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

General Overview

Virtual and augmented reality games use motion capture (or mocap) data as a source of animation for character models. In many interactive environments such as an escape room game, a game engine runs according to rules of the game by taking into account user movement and presenting an animated display that is responsive to the user movement.

The display of an augmented reality game is generally a video sequence presented to a display capable of displaying the video sequence. The display may be a virtual reality (VR) headset, for example. The video sequence typically includes multiple video frames. By rendering frames in succession according to a sequence order, simulated objects appear to move. The game engine typically generates frames in real-time such as in response to user movements and other user inputs.

The simulated objects can be generated entirely from mathematical models describing the shape of the objects (such as arms and a torso described by a set of plane and/or curve surfaces), generated from stored images (such as the face of a fictitious character), or a combination thereof. It should be noted that if a game engine (or more specifically, a rendering engine that is part of the game engine or used by the gamed engine) has data as to where each object or portion of a flexible object is in a scene, the frame for that scene can be rendered using standard rendering techniques so the more relevant aspect of a game is how to determine where each object is in the scene so that the rendered video sequence is appropriate.

The disclosed system addresses a problem in traditional motion capture systems tied to computer technology, namely the technical problem of tracking a rigid body in real-time when its markers become occluded. In real world environments, and especially when capturing the motion of multiple rigid bodies in real-time in constrained spaces, markers tracking a rigid body can often be occluded by other objects, or otherwise by environmental noise. These circumstances make it difficult to definitively recover a pose of the rigid body. Additionally, under conditions of occlusion, marker arrangements can become ambiguous, which makes it difficult for the motion capture system to differentiate between rigid bodies. The disclosed system solves this technical problem by providing a solution also rooted in computer technology, namely, by predicting a position in a current frame of an untracked rigid body by interpolation of previously tracked rigid body data.

The disclosed subject technology further provides improvements to the functioning of the computer itself because it saves data storage space and reduces the cost of system resources. Specifically, three or more unlabeled markers can be utilized to reconstruct a pose of a rigid body after the rigid body has become untracked. Additionally, this overcomes shortcomings associated with current solutions, which are monetarily costly, involve greater system resources, and/or reduce the quality of tracking.

As used herein, the term "frame" generally refers to an image of a video sequence. In some systems, such as interleaved displays, the frame may include multiple fields or more complex constructs, but generally a frame represents a view into a computer-generated scene at a particular time or short time window. For example, with 60 frame-per-second video, if one frame represents the scene at t=0, then the next frame would represent the scene at t=1/60 second. In some cases, a frame may represent the scene from t=0 to t=1/60, but in a simple case, the frame is a snapshot in time.

As used herein, the term "motion capture system" generally refers to an optical marker based system that returns translation (e.g., x-axis, y-axis, z-axis) information from tracked markers, by observing infrared-illuminated markers in a predefined area via multiple cameras.

As used herein, the term "prediction system" generally refers to a system that receives a rigid body data stream and an unlabeled marker data stream, and outputs a more complete rigid body data stream.

As used herein, the term "rigid body" generally refers to a unique configuration of markers (e.g., at least three) in the motion capture system. This represents a single tracker that is on a tracked prop or on the limbs of a human.

As used herein, the term "marker" generally refers to the situation when a retroreflective ball is captured by two or more cameras at the same time. The motion capture system will then generate a marker in the observed space. This will later be used to form a rigid body.

As used herein, the term "unlabeled marker" generally refers to any markers that are not correlated to a known rigid body within the motion capture system. These marker positions are sent to the prediction system.

As used herein, the term "labeled marker" generally refers to any markers that are correlated to a known rigid body within the motion capture system. The sole position of the labeled marker are not sent to the prediction system.

As used herein, the term "pivot point" generally refers to the singular reference point of a rigid body. This data object contains the full pose (e.g., position and orientation) of a tracker. All transformation and rotations will be applied to the pivot point, after which it is sent into the prediction system as part of the rigid body data stream.

Example System Architecture

FIG. 1 illustrates an example architecture for a motion capture system 100 in a computer-operated optical imaging environment suitable for capturing movement of one or more live actors. As shown, the motion capture system 100 includes balls 102 (e.g., denoted in the FIGS. as unshaded circles) coupled to trackers 104 in unique configurations 106. For example, each unique configuration may represent an identical object in the motion capture system 100, such as a body part or a prop (e.g., a toy gun). In some implementations, five balls 102 are coupled to a tracker 104 to allow for tracking of rotation and pivoting of an object. It will be appreciated that although five balls 102 are shown to be coupled to the tracker 104, other implementations may include a greater or lesser number of such balls 102 and/or arranged in a similar or different configuration, including different shapes and/or different sizes.

In some implementations, the balls 102 are each 19 mm spheres coated with a retroreflective coating on their surfaces. When illuminated by light (e.g., infrared light), the balls 102 illuminate for optical tracking by cameras positioned around a room. In some implementations, the tracker 104 is coupled to a live actor (e.g., a user). The live actor's movements are then captured via the motion of the reflective balls 102 by the cameras. Position data of each ball 102 is input into the motion capture system 100, which allows for tracking of the live actor's movements. The motion capture system 100 processes the position data and recreates a pose of the live actor that is output through a display (e.g., a VR headset). It will be appreciated that in other implementations the balls 102 may be larger or smaller than 19 mm, and there may be different sized balls 102 or the balls 102 may all be the same size.

In some implementations, multiple trackers 104 each having a unique configuration 106 are coupled to the live actor. For example, different trackers 104 with different configurations 106 may be coupled to the live actor's head, left arm, right arm, left foot, and right foot. Recreation of the live actor's pose in a digital format may then be accomplished through tracking of each tracker 104. It will be appreciated that although five trackers 104 are described to be utilized, other implementations may include a greater or lesser number of such trackers 104, and in other implementations the trackers 104 may be coupled to different parts of the live actor's body, clothing (e.g., a bodysuit), VR headset, and/or props.

Once the position data of each ball 102 is input into the motion capture system 100, each ball 102 becomes a marker 130 (e.g., denoted in the FIGS. as shaded circles). If the balls 102 are detected as being attached to the same tracker 104, the balls 102 become labeled markers 108 (e.g., denoted in the FIGS. as shaded circles with interconnecting lines). Each group of labeled markers 108 comprises a rigid body 110. For example, in the implementation described above, five labeled markers 108 comprise a rigid body 110. A pivot point 114 is also determined, for example, by calculating a center point of all the labeled markers 108. The pivot point 114 becomes the singular reference point of the rigid body 110, containing the full pose (e.g., position and orientation) of the tracker 104, to which all transformations and rotations will be applied. It will be appreciated that although five labeled markers 108 are shown to comprise a rigid body 110, other implementations may include a greater or lesser number of such labeled markers 108 for each rigid body 110, including different numbers of labeled markers 108 for different rigid bodies 110, and in other implementations different shapes and/or different sizes of labeled markers 108.

In some implementations, balls 102 that are not detected as being attached to the same tracker 104 become unlabeled markers 112 (e.g., denoted in the FIGS. as shaded circles without interconnecting lines). For example, in a situation where balls 102 and/or trackers 104 become occluded (e.g., one or more balls 102 are occluded), the motion capture system 100 is unable to recover the pose of the live actor, as will be discussed in more detail below.

Figure 2:
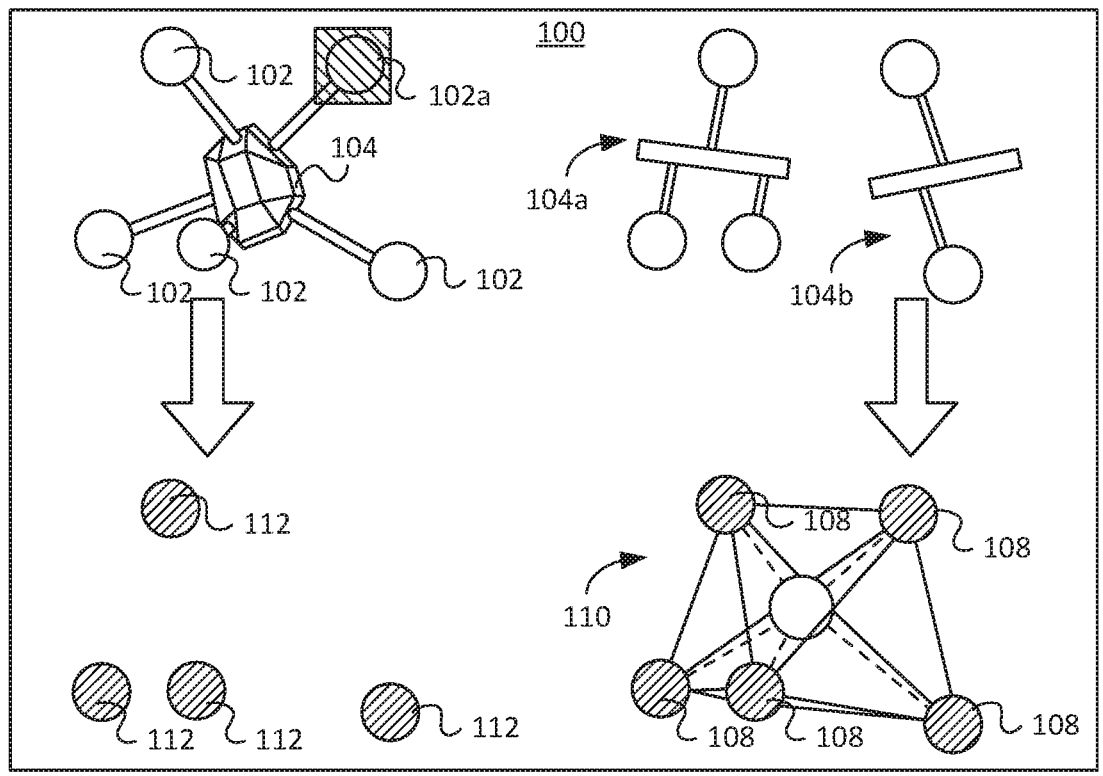
FIG. 2 illustrates an example system for motion capture when markers of a rigid body are occluded, according to certain aspects of the disclosure.

FIG. 2 illustrates a diagram of the motion capture system 100 when at least one ball 102a of a tracker 104 is occluded. In a conventional system (e.g., the motion capture system 100), once the at least one ball 102a is occluded, its corresponding marker 130 becomes lost, and the remaining markers 130 input into the motion capture system 100 become unlabeled markers 112. As a result, rather than detecting five labeled markers 108 of a rigid body 110, the motion capture system 100 detects only four unlabeled markers 112. Furthermore, the motion capture system 100 is unable to determine whether the unlabeled markers 112 correspond to the same rigid body 110, or are parts of two separate rigid bodies (e.g., ambiguous objects). Additionally, in situations where two separate trackers 104a and 104b have occluded balls, the motion capture system 100 may mistakenly interpret the markers 130 as labeled markers 108 of the same rigid body 110.

Figure 3A:
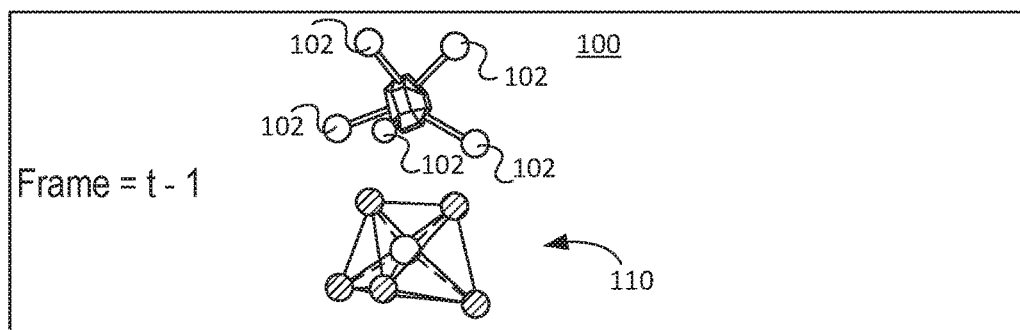
FIGS. 3A-3D illustrate an example of a motion capture system for capturing motion of a rigid body when markers are occluded, according to certain aspects of the disclosure.
Figure 3B:
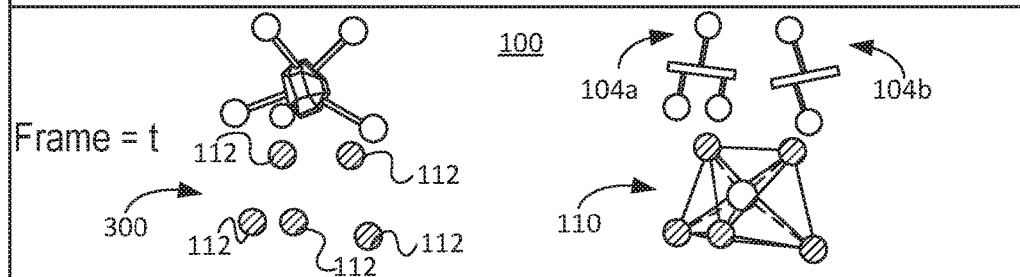

FIGS. 3A-3D illustrate a diagram of the motion capture system 100 for disambiguating between multiple possible matching rigid bodies. For example, as illustrated in FIG. 3A, at a previous frame (e.g., at time t−1), the tracker 104 is moving in the real world while also being tracked in the system 100 as the rigid body 110. For example, the rigid body 110 tracked in the previous frame is a previously tracked rigid body 110. As illustrated in FIG. 3B, at a current frame (e.g., at time t), an ambiguous object 300 appears. According to an aspect, the ambiguous object 300 may comprise multiple trackers 104a and 104b with some balls 102 occluded. For clarity, the occluded balls 102 are not illustrated. The ambiguous object 300 is misidentified in the system 100 as the rigid body 110.

Figure 3C:
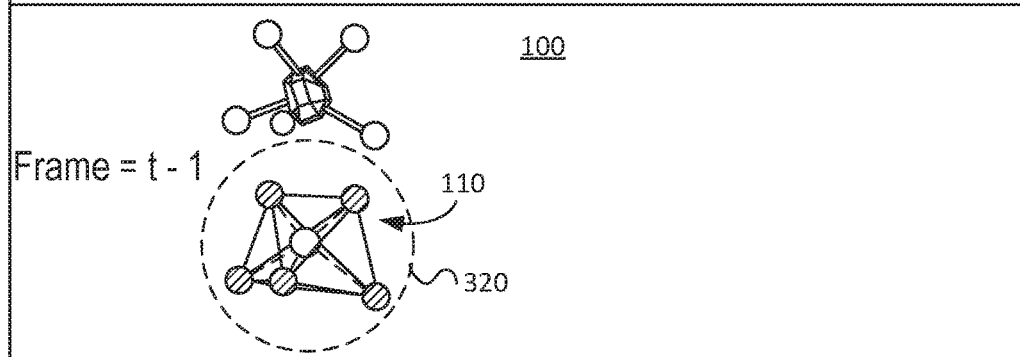

In order to remedy this situation, which was also described above in relation to FIG. 2, the motion capture system 100 may check to determine if the rigid body 110 was tracked in the previous frame. For example, the motion capture system 100 checks for previously tracked rigid bodies 110. If the rigid body 110 was tracked in the previous frame, the motion capture system 100 checks for teleportation of the rigid body 110. For example, as shown in FIG. 3C, the motion capture system 100 defines a maximum radius 320 around the rigid body 110 in the previous frame. The motion capture system 100 also compares a distance (e.g., a linear distance) between the rigid body 110 in the previous frame with the rigid body 110 in the current frame. If the distance is greater than a threshold distance (e.g., not within the maximum radius 320), the motion capture system 100 breaks the rigid body 110 down into unlabeled markers 112.

Figure 3D:
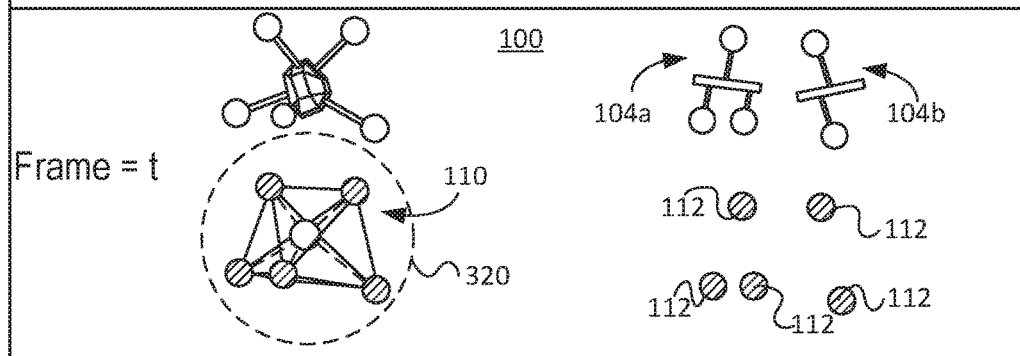

The motion capture system 100 further compares an angular distance between the rigid body 110 from the previous frame and the rigid body 110 in the current frame. If the angular distance is greater than a threshold angle (e.g., 25 degrees), the rigid body 110 is broken down into unlabeled markers 112. As shown in FIG. 3D, if both the linear distance and the angular distance between the rigid body 110 in the previous frame and the rigid body 110 in the current frame are within their respective thresholds, the motion capture system 100 treats it as a valid rigid body 110 and pushes the rigid body information back into a rigid body data stream.

In some implementations, if the rigid body 110 was not tracked in a previous frame, a current position of the rigid body 110 is compared with a last tracked position of the rigid body. For example, if the position of the rigid body 110 is close to the last tracked position, it is treated as a valid rigid body 110 and its information is pushed back into the rigid body data stream. If the position of the rigid body 110 is not close to the last tracked position, then it is determined whether the position of the rigid body 110 was tracked for a minimum number of frames (e.g., five frames). If the position of the rigid body 110 was not tracked for the minimum number of frames, then it is treated as invalid and is broken down into unlabeled markers 112. It will be appreciated that in other implementations the minimum number of frames may be greater than or less than five frames.

In some implementations, if the rigid body 110 has not moved beyond a minimum noise threshold (e.g., linear and angular distances), the rigid body 110 is treated as invalid and is broken down into unlabeled markers 112. This is to filter out environmental noise markers that do not move. For example, real markers 130 are coupled to moving objects (e.g., live actors).

If the rigid body 110 satisfies these conditions, it is treated as valid and its information is pushed back into the rigid body data stream. In some implementations, the broken down unlabeled markers 112 are filtered out from the rigid body data stream. These unlabeled markers 112 are aggregated with other unlabeled markers 112.

Figure 4A:
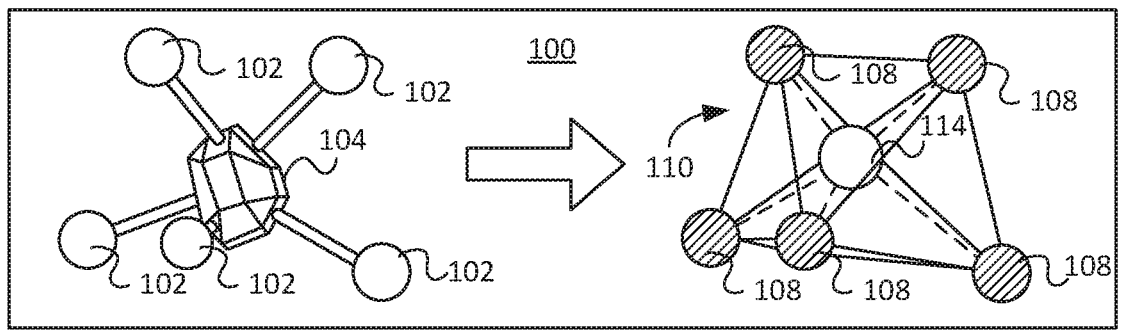
FIGS. 4A-4E illustrate example situations of a motion capture system where at least one marker is occluded, according to certain aspects of the disclosure.
Figure 4B:
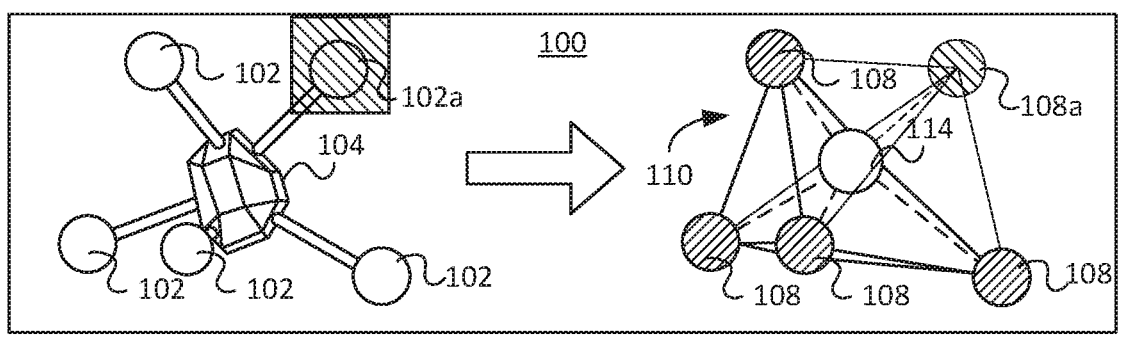

FIGS. 4A-4E illustrate example situations of the motion capture system 100 where markers 130 become occluded, according to certain aspects of the disclosure. In FIG. 4A, all five balls 102 of a tracker 104 are visible in a capture area. The rigid body 110 is perfectly tracked by the motion capture system 100 and the pivot point 114 is perfectly determined. In FIG. 4B, one ball 102a of the tracker 104 is occluded. The rigid body 110 including the pivot point 114 is still perfectly tracked with five labeled markers 108, including a labeled marker 108a for the occluded ball 102a.

Figure 4C:
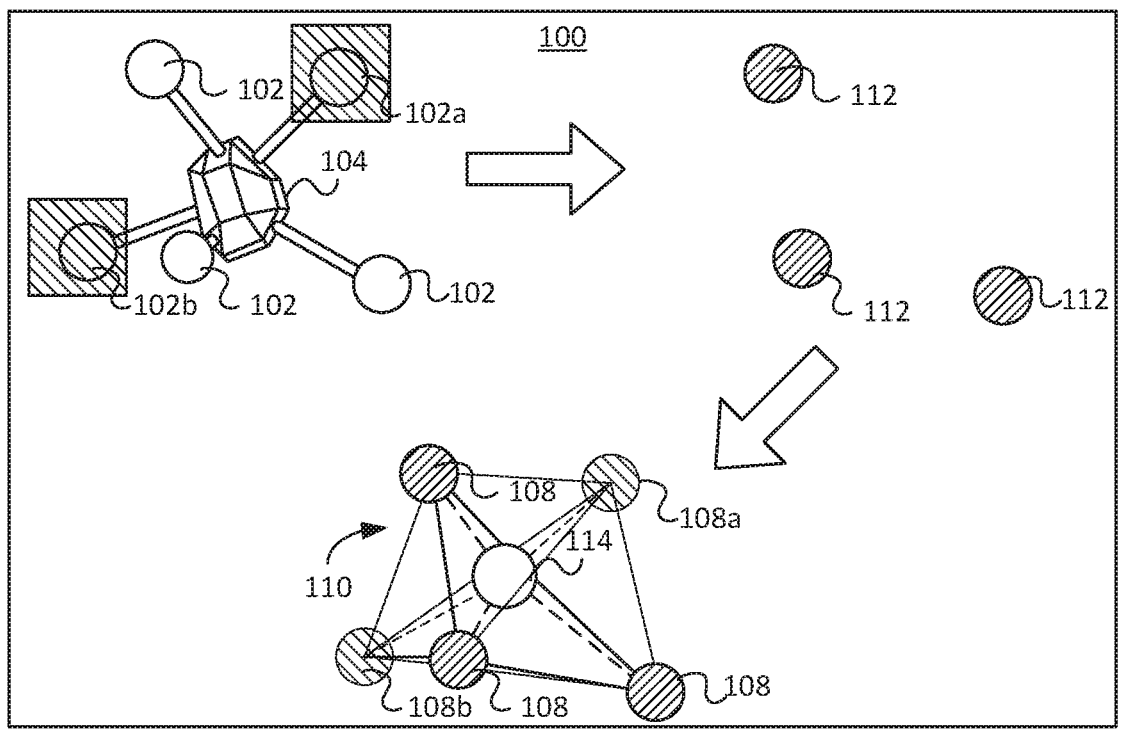

In FIG. 4C, two balls 102a and 102b of the tracker 104 are occluded. In this situation, the rigid body 110, which would include markers 108a and 108b corresponding to occluded balls 102a and 102b, is not tracked. All the markers 130 are now unlabeled markers 112 in the motion capture system 100. The three unlabeled markers 112 may be used to predict the rigid body 110 pose and the pivot point 114, as will be described in more detail below in FIGS. 5A-5C.

Figure 4D:
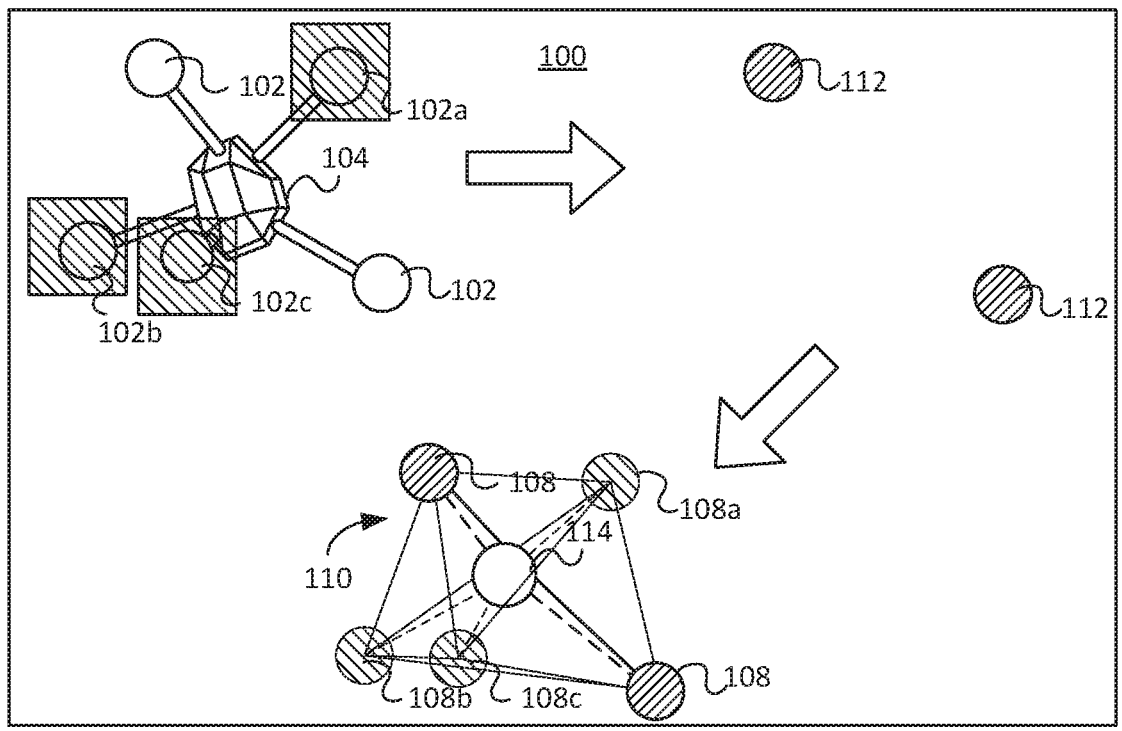

In FIG. 4D, three balls 102 of the tracker 104 are occluded. The rigid body 110 is not tracked, and all the markers 130 become unlabeled markers 112 in the motion capture system 100. If properly tracked, the rigid body 110 would include markers 108a, 108b, and 108c corresponding to occluded balls 102a, 102b, and 102c. Additionally, one axis of orientation is lost. The two unlabeled markers 112 may be used to predict the rigid body 110 pose and the pivot point 114, as will be described in more detail below in FIGS. 5A-5C.

Figure 4E:
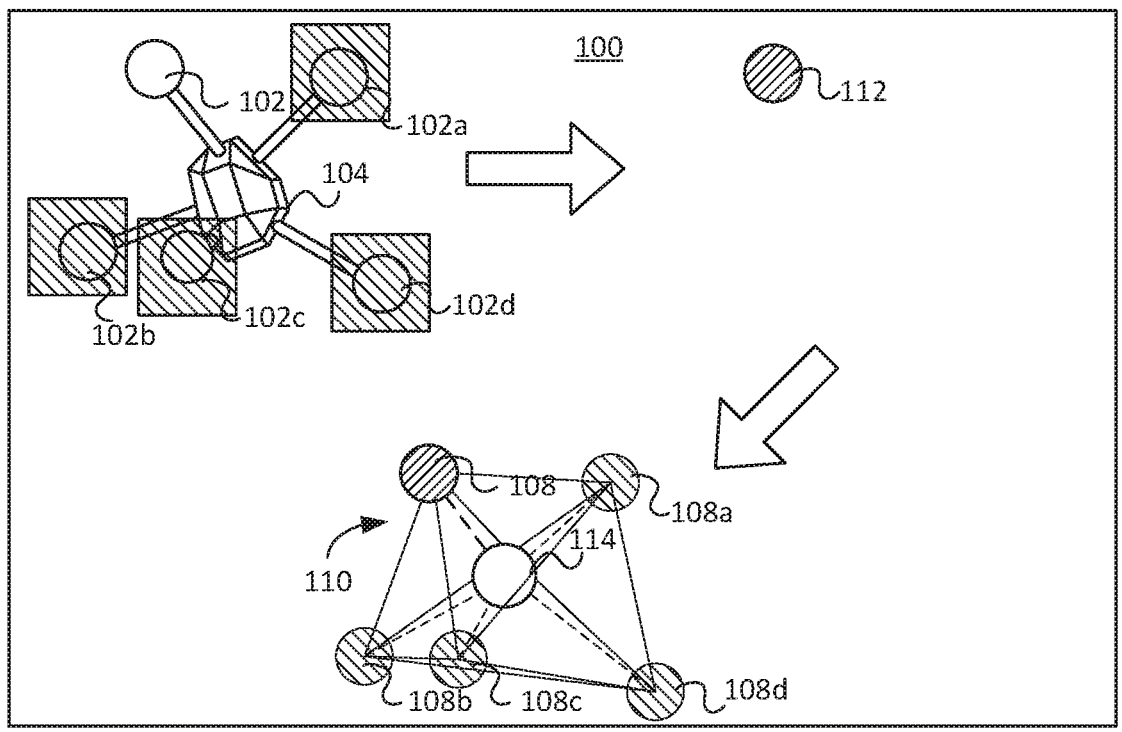

In FIG. 4E, four balls 102 of the tracker 104 are occluded. The rigid body 110 is not tracked. If properly tracked, the rigid body 110 would include markers 108a, 108b, 108c, and 108d corresponding to occluded balls 102a, 102b, 102c, and 102d. All the markers 130 are unlabeled markers 112 in the motion capture system 100. All orientation information is lost. The one unlabeled marker 112 may be used to predict the rigid body 110 pose and the pivot point 114, as will be described in more detail below in FIGS. 5A-5C.

Example System for Motion Prediction

Figure 5A:
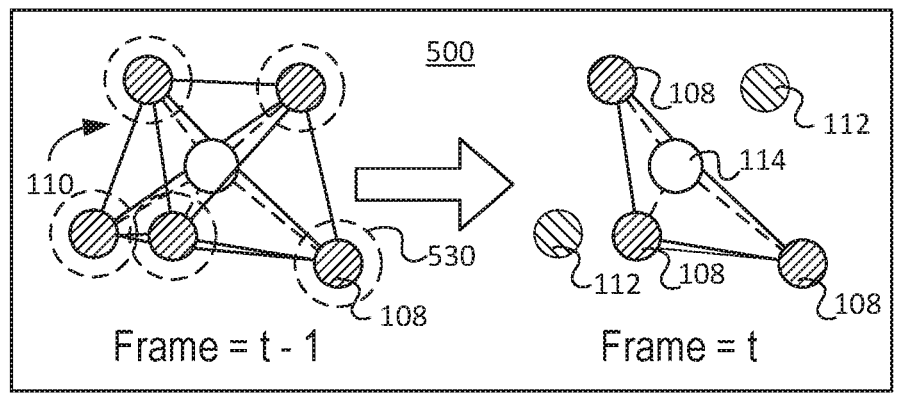
FIGS. 5A-5C illustrate an example motion prediction system for predicting motion of a rigid body, according to certain aspects of the disclosure.
Figure 5B:
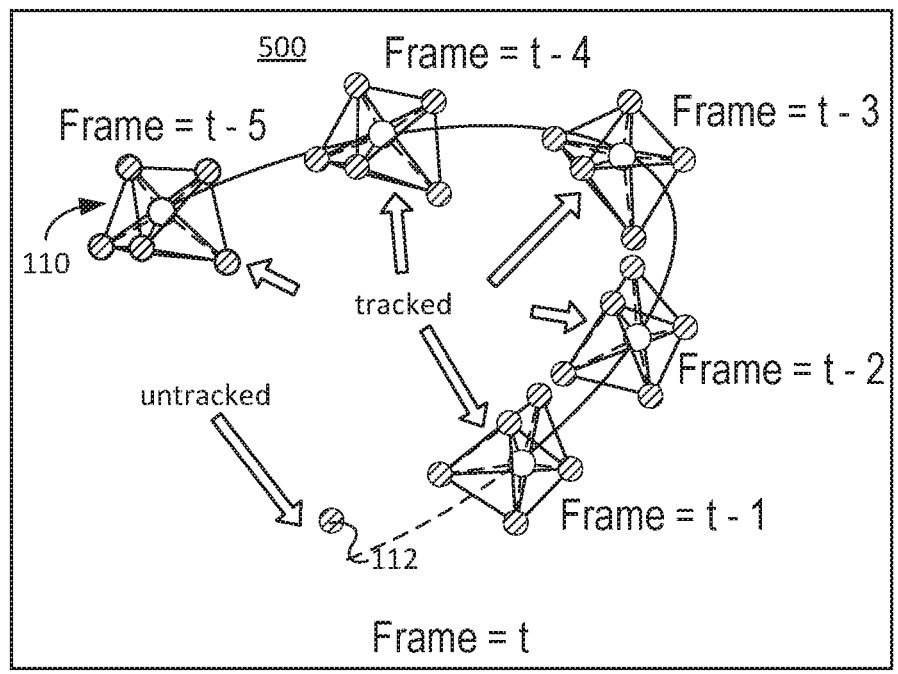
Figure 5C:
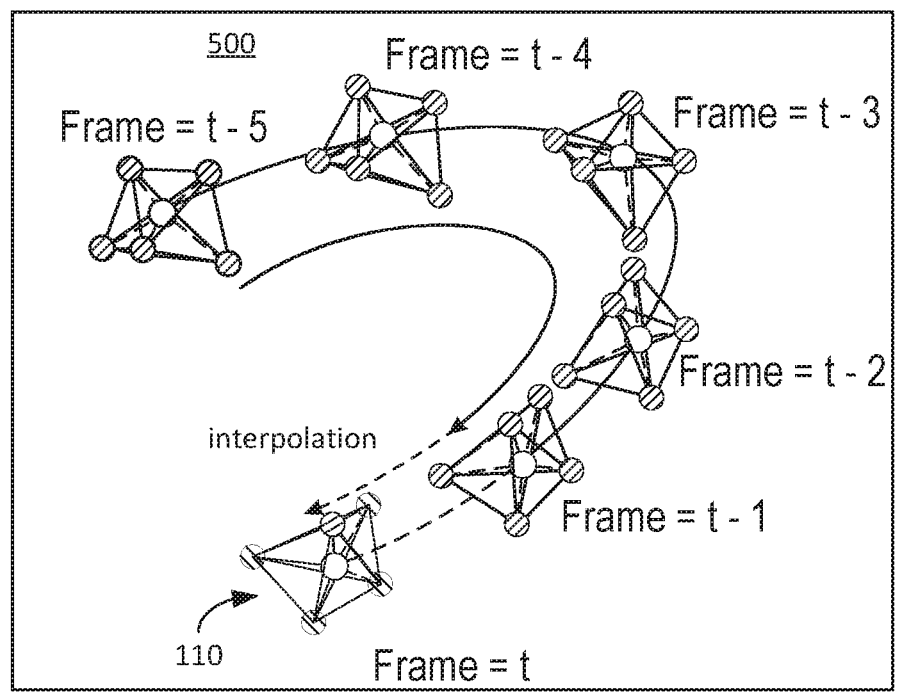

FIGS. 5A-5C illustrate an example motion prediction system 500 for predicting motion of a rigid body, according to certain aspects of the disclosure. As described above in FIGS. 4D and 4E, once less than three markers 130 are visible to the motion capture system 100, objects in the motion capture system 100 will lose tracking completely.

As illustrated in FIG. 5A, in order to recover a pose of a rigid body 110 when markers 130 are occluded, a radius 530 is defined around each labeled marker 108 for each frame (e.g., at time t, t−1, t−2, etc.). For example, if tracking of a rigid body 110 is lost at a current frame (e.g., time t), the prediction system 500 determines if the rigid body 110 was tracked in a previous frame (e.g., time t−1). If so, a radius 530 is defined around each labeled marker 108 in the previous frame. When object tracking is lost, the prediction system 500 will use unlabeled markers 112 in the current frame that are proximate to each radius 530 to predict the pose of the rigid body 110 in the current frame.

FIG. 5B illustrates tracking of a rigid body 110 from time t−5 to a current frame at time t, where tracking is lost due to four occluded markers 130. As illustrated, movement of the rigid body 110, including orientation and rotation information, is tracked in frames at time t−5 through time t−1. At the current frame, the rigid body 110 is untracked, resulting in only one unlabeled marker 112.

FIG. 5C illustrates reconstruction of the rigid body 110 when tracking is lost at the current frame (e.g., time t). For example, as illustrated in FIG. 5B, at the current frame, tracking of the rigid body 110 is lost and only one unlabeled marker 112 is tracked. In some implementations, angular velocity, angular acceleration, linear velocity, and/or linear acceleration of the rigid body 110 is stored in the system for the previous frames from time t−5 through t−1. This information may be used to interpolate a current pose (e.g., at time t) of the rigid body 110.

In some implementations, a pivot point 114 is determined by interpolation using previous angular velocity and acceleration of the tracked rigid body 110. The pivot point 114 may then be utilized to reconstruct a predicted rigid body pose. For example, tracked rigid bodies 110 in a current frame are compared with tracked rigid bodies 110 in a previous frame. A list of rigid bodies 110 that were tracked in the previous frame but not in the current frame is compiled. Position and orientation of each untracked rigid body 110 in the current frame are predicted through the prediction system 500 using previously tracked data (e.g., first order velocity and/or second order acceleration). Nearby unlabeled markers 112 are identified that are proximate to the predicted position and orientation of the untracked rigid bodies 110. Relative marker positions previously stored for the rigid body 110 may also be used to identify the nearby unlabeled markers 112. The rigid body 110 may then be reconstructed from the identified nearby unlabeled markers 112.

Figure 6A:
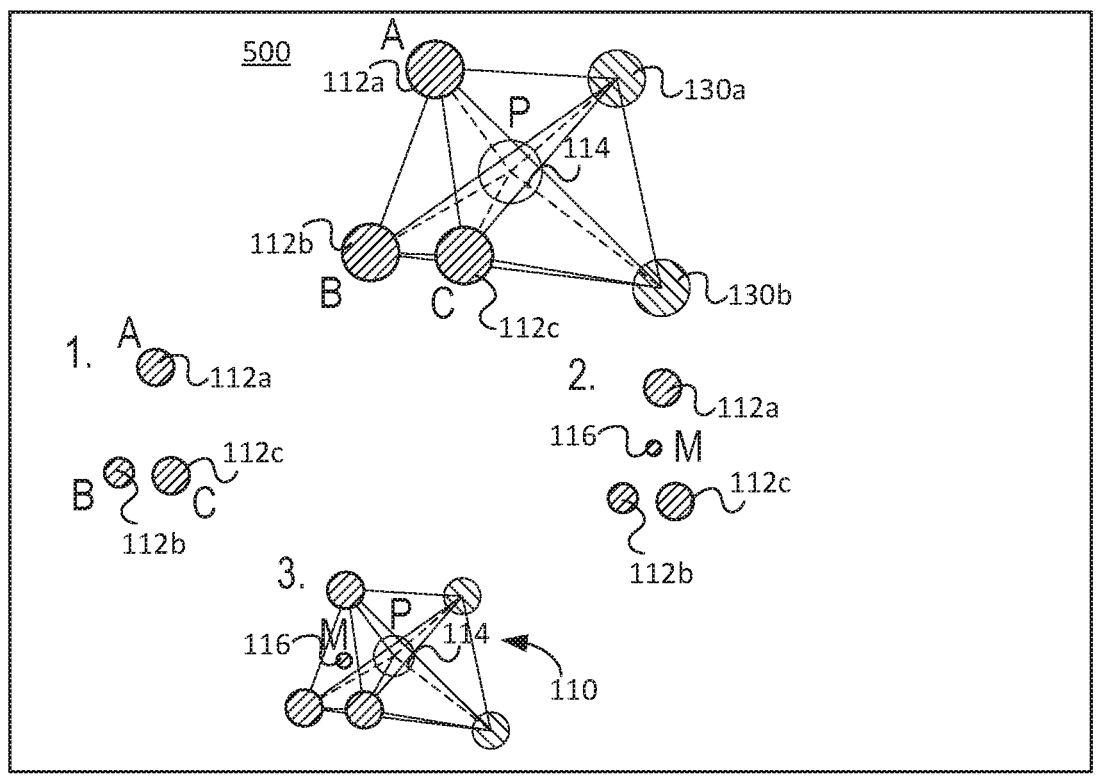
FIGS. 6A-6C illustrate an example motion prediction system for predicting motion of a rigid body, according to certain aspects of the disclosure.
Figure 6B:
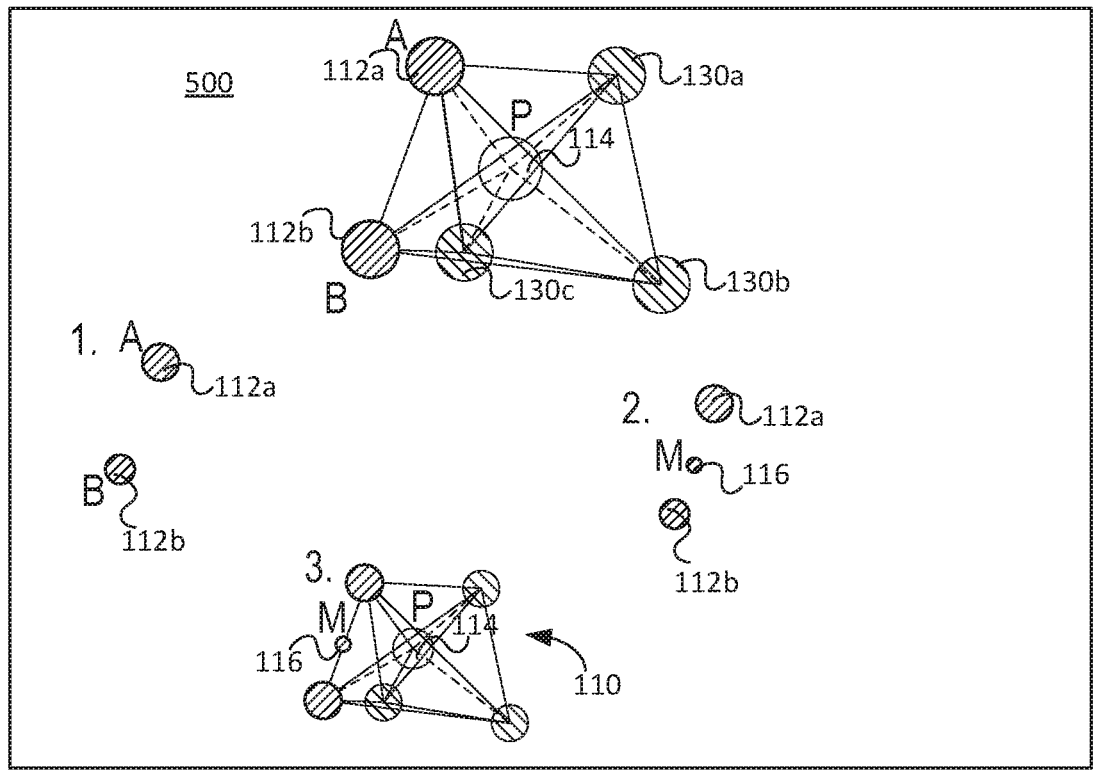
Figure 6C:
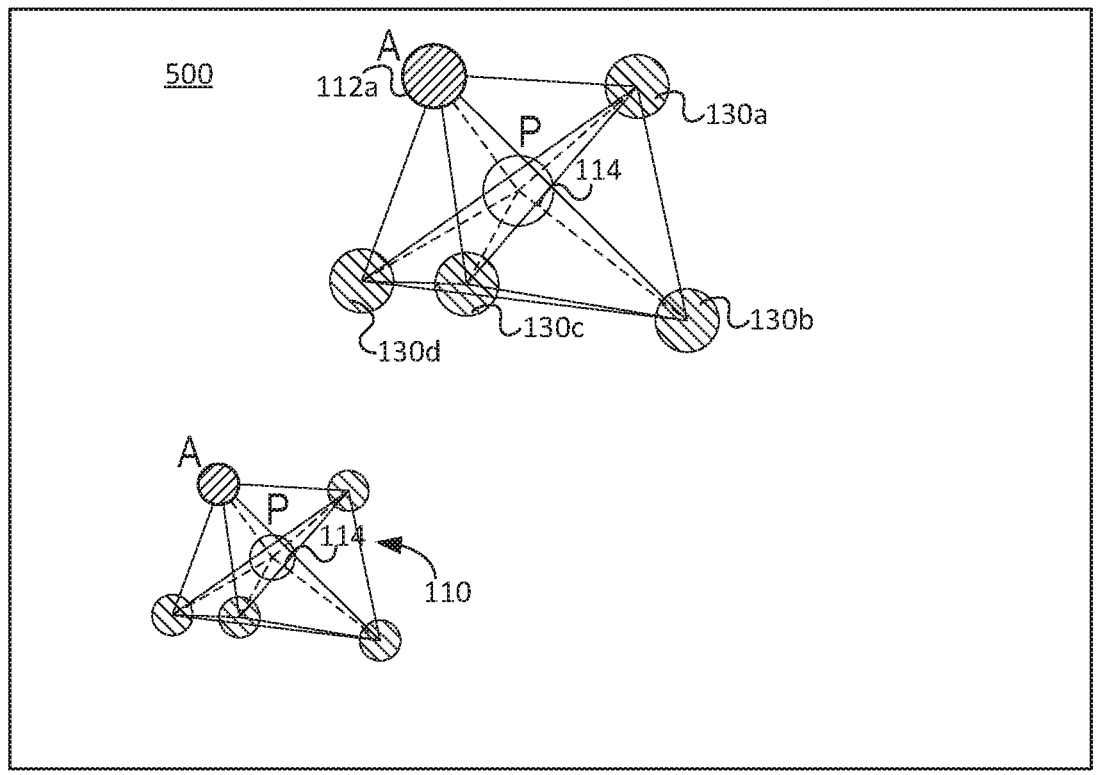

FIGS. 6A-6C illustrate an example motion prediction system 500 for predicting motion of a rigid body 110, according to certain aspects of the disclosure. FIG. 6A illustrates a situation where two markers 130a and 130b are occluded. The three unlabeled markers 112a, 112b, and 112c may be utilized to determine a pivot point 114 (labeled P) for reconstruction of the rigid body 110. Two vectors may be determined from the three unlabeled markers 112a, 112b, and 112c. For example, unlabeled markers 112a and 112b may define a first vector $\vec{AB}$ and unlabeled markers 112a and 112c may define a second vector $\vec{AC}$. The first vector $\vec{AB}$ and the second vector $\vec{AC}$ may be used to calculate an orientation of the rigid body 110. A midpoint 116 (labeled M) of the markers 112 may be determined through standard trigonometric techniques using the positions of the unlabeled markers 112a, 112b, and 112c. The midpoint M may then be used to determine a pivot point 114. The vector $\vec{MP}$ defined by midpoint M and the pivot point 114 is then used to reconstruct the rigid body 110 pose.

In some implementations, the vectors may be defined for a current frame k. For example, the unlabeled markers 112a and 112b in current frame k may define vector $\vec{AB}_k$, and the unlabeled markers 112a and 112c in current frame k may define vector $\vec{AC}_k$. The corresponding markers 130 from the rigid body 110 in its last tracked frame k−1 may similarly be used to define vector $\vec{AB}_{k-1}$ and vector $\vec{AC}_{k-1}$. Midpoints $M_k$ and $M_{k-1}$ may be determined using the positions of the markers in the current frame and the last tracked frame, respectively. The orientation of the rigid body 110 in the previous frame may be calculated, and denoted as $Q_{k-1}$. An orientation offset $Q_{offset}$ may be calculated by:

$$Q_{offset} \times Q_{k-1} = M_{k-1} \quad (1)$$

$$Q_{offset} = M_{k-1} \times Q_{k-1}^{-1} \quad (2)$$

The current orientation $Q_k$ of the rigid body 110 may be calculated from $M_k$ as follows:

$$Q_{offset} \times Q_k = M_k \qquad (3)$$

$$Q_k = Q_{offset}^{-1} \times M_k \qquad (4)$$

$$Q_k = Q_{k-1} \times M_{k-1}^{-1} \times M_k \qquad (5)$$

FIG. 6B illustrates a situation where three markers 130a, 130b, and 130c are occluded. The two remaining unlabeled markers 112a and 112b may be utilized to determine a pivot point 114 (labeled P) for reconstruction of the rigid body 110. A vector $\overrightarrow{AB}$ is defined by unlabeled markers 112a and 112b. A midpoint 116 (labeled M) between the unlabeled markers 112a and 112b is also determined. The pivot point 114 may be determined by interpolation of previous angular velocity and acceleration information of the rigid body 110. The vector $\overrightarrow{MP}$ defined by the midpoint M and the pivot point 114 is then used to reconstruct the rigid body 110 pose.

In some implementations, the two unlabeled markers 112a and 112b form a vector in a current frame k, $\overrightarrow{AB}_k$. The prediction system 500 matches the unlabeled markers 112a and 112b against corresponding markers from the rigid body 110 in a last tracked frame. The prediction system 500 creates a vector from the last tracked frame of the rigid body 110 by a similar method as described above, to define vector $\overrightarrow{AB}_{k-1}$. A rotational translation, $Q_D$ is calculated using vectors $\overrightarrow{AB}_k$ and $\overrightarrow{AB}_{k-1}$. The current orientation $Q_k$ for reconstructing the rigid body 110 from $Q_D$ may be determined by:

$$Q_k = Q_D \times Q_{k-1} \qquad (6)$$

In some implementations, an inertial measurement unit (IMU) device may provide additional orientation information, which may be combined with rotation and translation information calculated above to compensate for missing rotation information about vector $\overrightarrow{AB}$.

FIG. 6C illustrates a situation where four markers 130a, 130b, 130c, and 130d are occluded. The one remaining unlabeled marker 112a may be utilized to determine a pivot point 114 (labeled P) for reconstruction of the rigid body 110. For example, the pivot point 114 may be determined by interpolation of previous angular velocity and acceleration information of the rigid body 110. An IMU device can provide additional orientation information for reconstruction of the rigid body 110.

In some implementations, predicted orientation from previously tracked frames may be used to supplement missing information for reconstruction. For example, a midpoint of all unlabeled markers 112 is determined and combined with the previously reconstructed orientation information to recover the position of the reconstructed rigid body 110.

The techniques described herein may be implemented as method(s) that are performed by physical computing device(s), as one or more non-transitory computer-readable storage media storing instructions (e.g., stored sequences of instructions) which, when executed by computing device(s), cause performance of the method(s), or, as physical computing device(s) that are specially configured with a combination of hardware and software that causes performance of the method(s).

Figure 7:
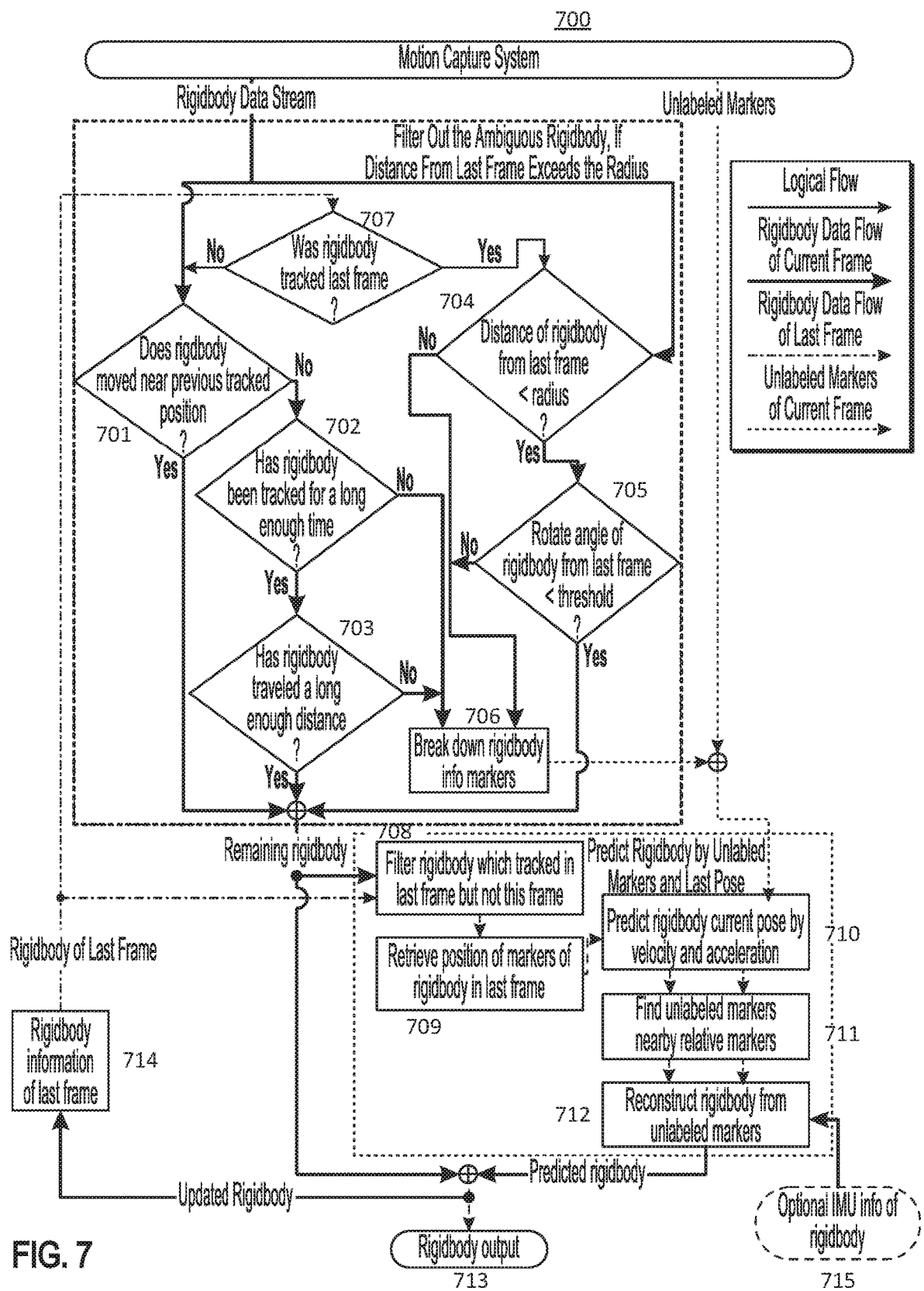
FIG. 7 illustrates an example flow diagram for real-time rigid body motion prediction, according to certain aspects of the disclosure.

FIG. 7 illustrates an example flow diagram 700 for real-time rigid body motion prediction when markers are occluded, such as in FIGS. 6A-6C. For explanatory purposes, the example process 700 is described herein with reference to the motion capture system 100 of FIG. 1 and the prediction system 500 of FIG. 5. Further for explanatory purposes, the blocks of the example process 700 are described herein as occurring in serial, or linearly. However, multiple blocks of the example process 700 may occur in parallel. In addition, the blocks of the example process 700 need not be performed in the order shown and/or one or more of the blocks of the example process 700 need not be performed. For purposes of explanation of the subject technology, the process 700 will be discussed in reference to FIGS. 1 and 5.

At 701, a rigid body data stream is provided to a motion capture system 100. The motion capture system 100 determines whether a rigid body moved near a previously tracked position. If yes, the rigid body information is output at 713. Remaining rigid body information is input into a prediction system 500 at 708. Updated rigid body information is input as rigid body information of last frame at 714, which is input back into the motion capture system 100 at 707, and also into the prediction system at 708.

If no, the motion capture system 100 determines at 702 whether the rigid body has been tracked for a long enough time. For example, the rigid body may have been tracked for at least five frames. If yes, it is determined at 703 whether the rigid body has traveled a long enough distance. For example, the rigid body may have traveled a threshold distance. If yes, the process continues to 713, 708, and 714, as described above.

If the rigid body has not traveled a long enough distance, then at 706 the rigid body is broken down into markers and input into the prediction system 500 at 710. In some implementations, the prediction system 500 predicts motion of the rigid body using unlabeled markers and a previous pose of the rigid body. At 709, positions of markers of the rigid body in a previous frame are retrieved and used to predict the current rigid body pose at 710.

At 710, a current pose of the rigid body is predicted by using velocity and acceleration information. Additional unlabeled markers from the motion capture system 100 are also received at 710. At 711, unlabeled markers are found that are nearby to relative markers. At 712, the rigid body is reconstructed from the unlabeled markers. In some implementations, at 715, IMU information of the rigid body may be used to reconstruct the rigid body. The predicted rigid body information is then output as the rigid body output at 713.

At 707, rigid body information from a previous frame is received from 714. It is determined whether the rigid body was tracked in a previous frame. If no, it is determined at 701 whether the rigid body moved near a previously tracked position. If yes, it is determined at 704 whether a distance of the rigid body from the previous frame is within a threshold radius. For example, ambiguous rigid bodies are filtered out if the distance from the previous frame exceeds the radius. If no, the rigid body is broken down into markers at 706. If yes, it is determined at 705 whether a rotated angle of the rigid body from the previous frame is within a threshold angle. If no, the rigid body is broken down into markers at 706. If yes, the rigid body is output at 713.

Hardware Overview

Figure 8:
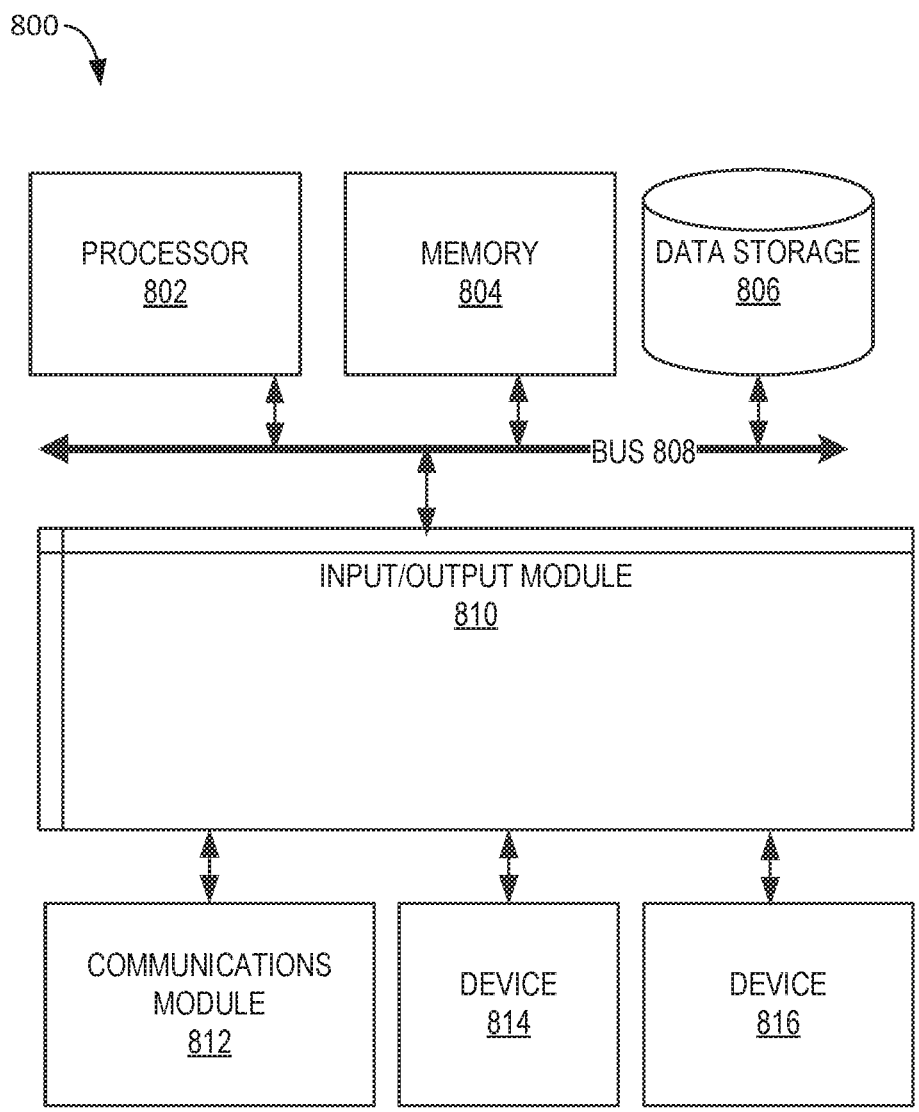
FIG. 8 is a block diagram illustrating an example computer system with which aspects of the subject technology can be implemented.

FIG. 8 is a block diagram illustrating an example computer system 800 with which a motion capture system 100 of FIG. 1 and a prediction system 500 of FIG. 5 can be implemented. In certain aspects, the computer system 800 may be implemented using hardware or a combination of software and hardware, either in a dedicated server, or integrated into another entity, or distributed across multiple entities.

Computer system 800 (e.g., motion capture system 100 and prediction system 500) includes a bus 808 or other communication mechanism for communicating information, and a processor 802 coupled with bus 808 for processing information. According to one aspect, the computer system 800 can be a cloud computing server of an IaaS that is able to support PaaS and SaaS services. According to one aspect, the computer system 800 is implemented as one or more special-purpose computing devices. The special-purpose computing device may be hard-wired to perform the disclosed techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices, or any other device that incorporates hard-wired and/or program logic to implement the techniques. By way of example, the computer system 800 may be implemented with one or more processors 802. Processor 802 may be a general-purpose microprocessor, a microcontroller, a Digital Signal Processor (DSP), an ASIC, an FPGA, a Programmable Logic Device (PLD), a controller, a state machine, gated logic, discrete hardware components, or any other suitable entity that can perform calculations or other manipulations of information.

Computer system 800 can include, in addition to hardware, code that creates an execution environment for the computer program in question, e.g., code that constitutes processor firmware, a protocol stack, a database management system, an operating system, or a combination of one or more of them stored in an included memory 804, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 808 for storing information and instructions to be executed by processor 802. The processor 802 and the memory 804 can be supplemented by, or incorporated in, special purpose logic circuitry. Expansion memory may also be provided and connected to computer system 800 through input/output module 810, which may include, for example, a SIMM (Single In Line Memory Module) card interface. Such expansion memory may provide extra storage space for computer system 800, or may also store applications or other information for computer system 800. Specifically, expansion memory may include instructions to carry out or supplement the processes described above, and may include secure information also. Thus, for example, expansion memory may be provided as a security module for computer system 800, and may be programmed with instructions that permit secure use of computer system 800. In addition, secure applications may be provided via the SIMM cards, along with additional information, such as placing identifying information on the SIMM card in a non-hackable manner.

The instructions may be stored in the memory 804 and implemented in one or more computer program products, e.g., one or more modules of computer program instructions encoded on a computer readable medium for execution by, or to control the operation of, the computer system 800, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, with languages, embeddable languages, and xml-based languages. Memory 804 may also be used for storing temporary variable or other intermediate information during execution of instructions to be executed by processor 802.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network, such as in a cloud-computing environment. The processes and logic flows described in this specification can be performed by one or more programmable processors executing one or more computer programs to perform functions by operating on input data and generating output.

Computer system 800 further includes a data storage device 806 such as a magnetic disk or optical disk, coupled to bus 808 for storing information and instructions. Computer system 800 may be coupled via input/output module 810 to various devices. The input/output module 810 can be any input/output module. Example input/output modules 810 include data ports such as USB ports. In addition, input/output module 810 may be provided in communication with processor 802, so as to enable near area communication of computer system 800 with other devices. The input/output module 810 may provide, for example, wired communication in some implementations, or wireless communication in other implementations, and multiple interfaces may also be used. The input/output module 810 is configured to connect to a communications module 812. Example communications modules 812 include networking interface cards, such as Ethernet cards and modems.

The components of the system can be interconnected by any form or medium of digital data communication (e.g., a communication network). The communication network can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

For example, in certain aspects, communications module 812 can provide a two-way data communication coupling to a network link that is connected to a local network. Wireless links and wireless communication may also be implemented. Wireless communication may be provided under various modes or protocols, such as GSM (Global System for Mobile Communications), Short Message Service (SMS), Enhanced Messaging Service (EMS), or Multimedia Messaging Service (MMS) messaging, CDMA (Code Division Multiple Access), Time Division Multiple Access (TDMA), Personal Digital Cellular (PDC), Wideband CDMA, General Packet Radio Service (GPRS), or LTE (Long-Term Evolution), among others. Such communication may occur, for example, through a radio-frequency transceiver. In addition, short-range communication may occur, such as using a BLUETOOTH, WI-FI, or other such transceiver.

In any such implementation, communications module 812 sends and receives electrical, electromagnetic, or optical signals that carry digital data streams representing various types of information. The network link typically provides data communication through one or more networks to other data devices. For example, the network link of the communications module 812 may provide a connection through local network to a host computer or to data equipment operated by an Internet Service Provider (ISP). The ISP in turn provides data communication services through the world wide packet data communication network now commonly referred to as the "Internet." The local network and Internet both use electrical, electromagnetic, or optical signals that carry digital data streams. The signals through the various networks and the signals on the network link and through communications module 812, which carry the digital data to and from computer system 800, are example forms of transmission media.

Computer system 800 can send messages and receive data, including program code, through the network(s), the network link, and communications module 812. In the Internet example, a server might transmit a requested code for an application program through the Internet, the ISP, the local network, and communications module 812. The received code may be executed by processor 802 as it is received, and/or stored in data storage 806 for later execution.

In certain aspects, the input/output module 810 is configured to connect to a plurality of devices, such as an input device 814 and/or an output device 816. Example input devices 814 include a keyboard and a pointing device, e.g., a mouse or a trackball, by which a user can provide input to the computer system 800. Other kinds of input devices 814 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Example output devices 816 include display devices, such as an LED (light emitting diode), CRT (cathode ray tube), LCD (liquid crystal display) screen, a TFT LCD (Thin-Film-Transistor Liquid Crystal Display), or an OLED (Organic Light Emitting Diode) display, for displaying information to the user. The output device 816 may comprise appropriate circuitry for driving the output device 816 to present graphical and other information to a user.

According to one aspect of the present disclosure, the motion capture system 100 and/or the prediction system 500 can be implemented using a computer system 800 in response to processor 802 executing one or more sequences of one or more instructions contained in memory 804. Such instructions may be read into memory 804 from another machine-readable medium, such as data storage device 806. Execution of the sequences of instructions contained in main memory 804 causes processor 802 to perform the process steps described herein. One or more processors in a multi-processing arrangement may also be employed to execute the sequences of instructions contained in memory 804. Processor 802 may process the executable instructions and/or data structures by remotely accessing the computer program product, for example by downloading the executable instructions and/or data structures from a remote server through communications module 812 (e.g., as in a cloud-computing environment). In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. For example, some aspects of the subject matter described in this specification may be performed on a cloud-computing environment. Accordingly, in certain aspects, a user of systems and methods as disclosed herein may perform at least some of the steps by accessing a cloud server through a network connection. Further, data files, circuit diagrams, performance specifications, and the like resulting from the disclosure may be stored in a database server in the cloud-computing environment, or may be downloaded to a private storage device from the cloud-computing environment.

Computing system 800 can include clients and servers. A client and server are generally remote from each other and typically interact through a communication network. The relationship of client and server arises by virtue of computer programs running on the respective computers and having a client-server relationship to each other. Computer system 800 can be, for example, and without limitation, a desktop computer, laptop computer, or tablet computer. Computer system 800 can also be embedded in another device, for example, and without limitation, a mobile telephone, a personal digital assistant (PDA), a mobile audio player, a Global Positioning System (GPS) receiver, and/or a television set top box.

The term "machine-readable storage medium" or "computer-readable medium" as used herein refers to any medium or media that is provided including instructions or data to processor 802 for execution. The term "storage medium" as used herein refers to any non-transitory computer readable storage medium that stores data and/or instructions that cause a machine to operate in a specific fashion. Such a medium may take many forms, including, but not limited to, non-volatile media, volatile media, and transmission media. Non-volatile media include, for example, optical disks, magnetic disks, or flash memory, such as data storage device 806. Volatile media include dynamic memory, such as memory 804. Transmission media include coaxial cables, copper wire, and fiber optics, including the wires that comprise bus 808. Common forms of machine-readable media include, for example, a floppy disk, a flexible disk, a hard disk, magnetic tape, any other magnetic medium, a CD-ROM, a DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used in this specification of this application, the terms "computer-readable storage medium" and "computer-readable media" are entirely restricted to tangible, physical objects that store information in a form that is readable by a computer. These terms exclude any wireless signals, wired download signals, and any other ephemeral signals. Storage media is distinct from but may be used in conjunction with transmission media. Transmission media participates in transferring information between storage media. For example, transmission media includes coaxial cables, copper wire, and fiber optics, including the wires that comprise bus 808. Transmission media can also take the form of acoustic or light waves, such as those generated during radio-wave and infra-red data communications. Furthermore, as used in this specification of this application, the terms "computer," "server," "processor," and "memory" all refer to electronic or other technological devices. These terms exclude people or groups of people. For the purposes of the specification, the terms display or displaying means displaying on an electronic device.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. Relational terms such as first, second, and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public, regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately, or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method for rigid body motion prediction comprising:
    tracking movements of at least one rigid body;
    determining an occurrence of an untracked rigid body in a current frame, the untracked rigid body comprising a rigid body that was tracked in a previous frame;
    predicting a position in the current frame of the untracked rigid body using previously tracked data of the untracked rigid body in the previous frame;
    identifying unlabeled markers in the current frame that are proximate to the predicted position of the untracked rigid body in the current frame; and
    reconstructing the untracked rigid body in the current frame based on the identifying.

2. The computer-implemented method of claim 1, further comprising:
    predicting a current orientation in the current frame of the untracked rigid body using the previously tracked data in the previous frame.

3. The computer-implemented method of claim 1, wherein the predicting further comprises:
    interpolating angular velocity, angular acceleration, linear velocity, and/or linear acceleration of the untracked rigid body using the previously tracked data.

4. The computer-implemented method of claim 1, further comprising:
    labeling the unlabeled markers corresponding to the untracked rigid body.

5. The computer-implemented method of claim 1, further comprising:
    comparing currently tracked rigid bodies in the current frame with previously tracked rigid bodies in the previous frame.

6. The computer-implemented method of claim 5, further comprising:
    defining a maximum radius about each previously tracked rigid body.

7. The computer-implemented method of claim 6, further comprising:
    filtering out the untracked rigid body when a distance between the untracked rigid body and the previously tracked rigid body exceeds the maximum radius.

8. The computer-implemented method of claim 1, wherein each previously tracked rigid body comprises labeled markers, further comprising:
    defining a radius around each labeled marker.

9. The computer-implemented method of claim 8, further comprising:
    filtering out the unlabeled markers when a distance between the unlabeled markers and the labeled markers exceeds the radius.

10. The computer-implemented method of claim 1, wherein the reconstructing further comprises:
    defining at least one vector based on the unlabeled markers; and
    defining a pivot point using the previously tracked data to reconstruct a rigid body pose.

11. The computer-implemented method of claim 10, further comprising:
    determining a midpoint between the unlabeled markers.

12. A system for rigid body motion prediction, comprising:
    a memory storing sequences of instructions; and
    a processor configured to execute the sequences of instructions which, when executed, causes the processor to perform:
        tracking movements of at least one rigid body;
        determining an occurrence of an untracked rigid body in a current frame, the untracked rigid body comprising a rigid body that was tracked in a previous frame;
        predicting a position in the current frame of the untracked rigid body using previously tracked data of the untracked rigid body in the previous frame;
        identifying unlabeled markers in the current frame that are proximate to the predicted position of the untracked rigid body in the current frame; and
        reconstructing the untracked rigid body in the current frame based on the identifying.

13. The system of claim 12, further comprising stored sequences of instructions, which when executed by the processor, cause the processor to perform:
    predicting a current orientation in the current frame of the untracked rigid body using previously tracked data in the previous frame.

14. The system of claim 12, further comprising stored sequences of instructions, which when executed by the processor, cause the processor to perform:
    interpolating angular velocity, angular acceleration, linear velocity, and/or linear acceleration of the untracked rigid body using previously tracked data in the previous frame.

15. The system of claim 12, further comprising stored sequences of instructions, which when executed by the processor, cause the processor to perform:
    labeling the unlabeled markers corresponding to the untracked rigid body.

16. The system of claim 12, further comprising stored sequences of instructions, which when executed by the processor, cause the processor to perform:
    comparing currently tracked rigid bodies in the current frame with previously tracked rigid bodies in the previous frame.

17. The system of claim 16, further comprising stored sequences of instructions, which when executed by the processor, cause the processor to perform:
  defining a maximum radius about each previously tracked rigid body.

18. The system of claim 17, further comprising stored sequences of instructions, which when executed by the processor, cause the processor to perform:
  filtering out the untracked rigid body when a distance between the untracked rigid body and the previously tracked rigid body exceeds the maximum radius.

19. A non-transitory computer readable storage medium is provided including instructions that, when executed by a processor, case the processor to perform a method for rigid body motion prediction, the method comprising:
  tracking movements of at least one rigid body;
  determining an occurrence of an untracked rigid body in a current frame, the untracked rigid body comprising a rigid body that was tracked in a previous frame;
  predicting a position in the current frame of the untracked rigid body using previously tracked data of the untracked rigid body in the previous frame;
  identifying unlabeled markers in the current frame that are proximate to the predicted position of the untracked rigid body in the current frame; and
  reconstructing the untracked rigid body in the current frame based on the identifying.

20. The non-transitory computer readable storage medium of claim 19, wherein the method further comprises:
  predicting a current orientation in the current frame of the untracked rigid body using the previously tracked data in the previous frame.

\* \* \* \* \*